No. 735,283. PATENTED AUG. 4, 1903.
H. R. MUENSTER.
POTATO DIGGER.
APPLICATION FILED JUNE 2, 1902.
NO MODEL. 2 SHEETS—SHEET 2.
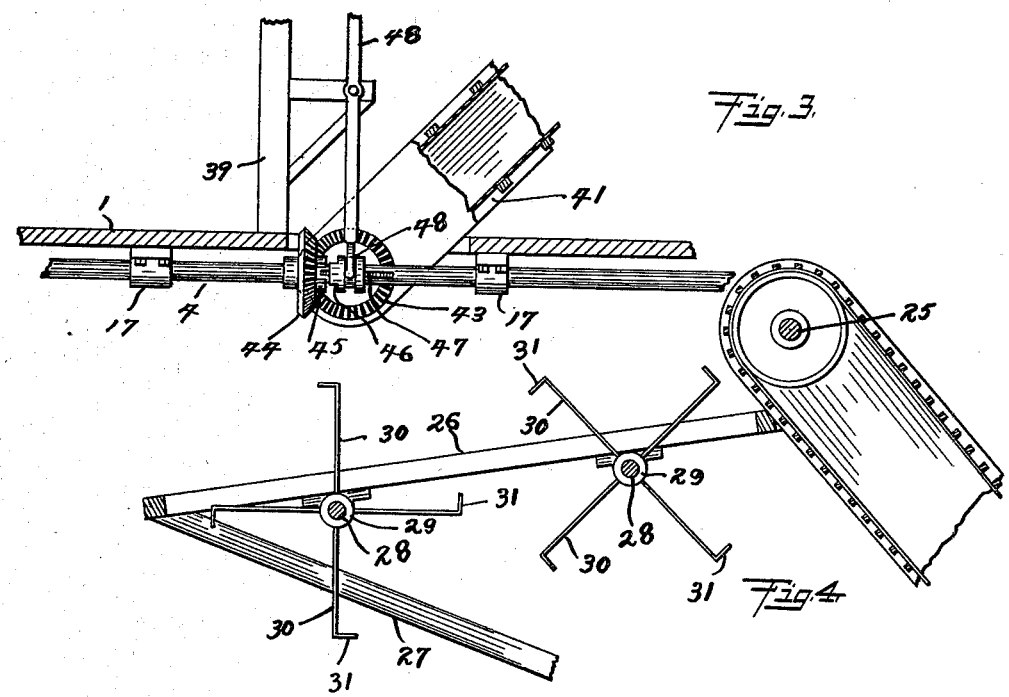
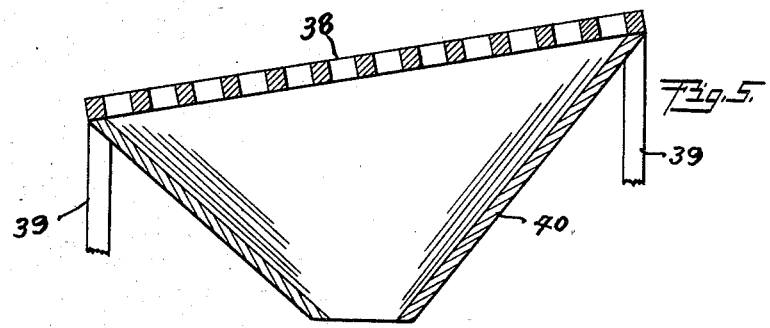
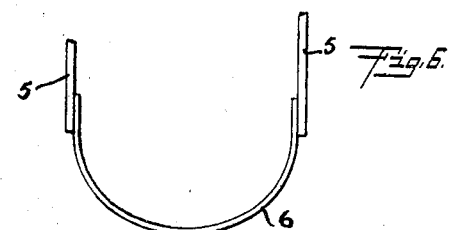
WITNESSES:
D. O. Barnell
INVENTOR
Hermann R. Muenster.
BY
Howard J. Cowgill.
ATTORNEY.

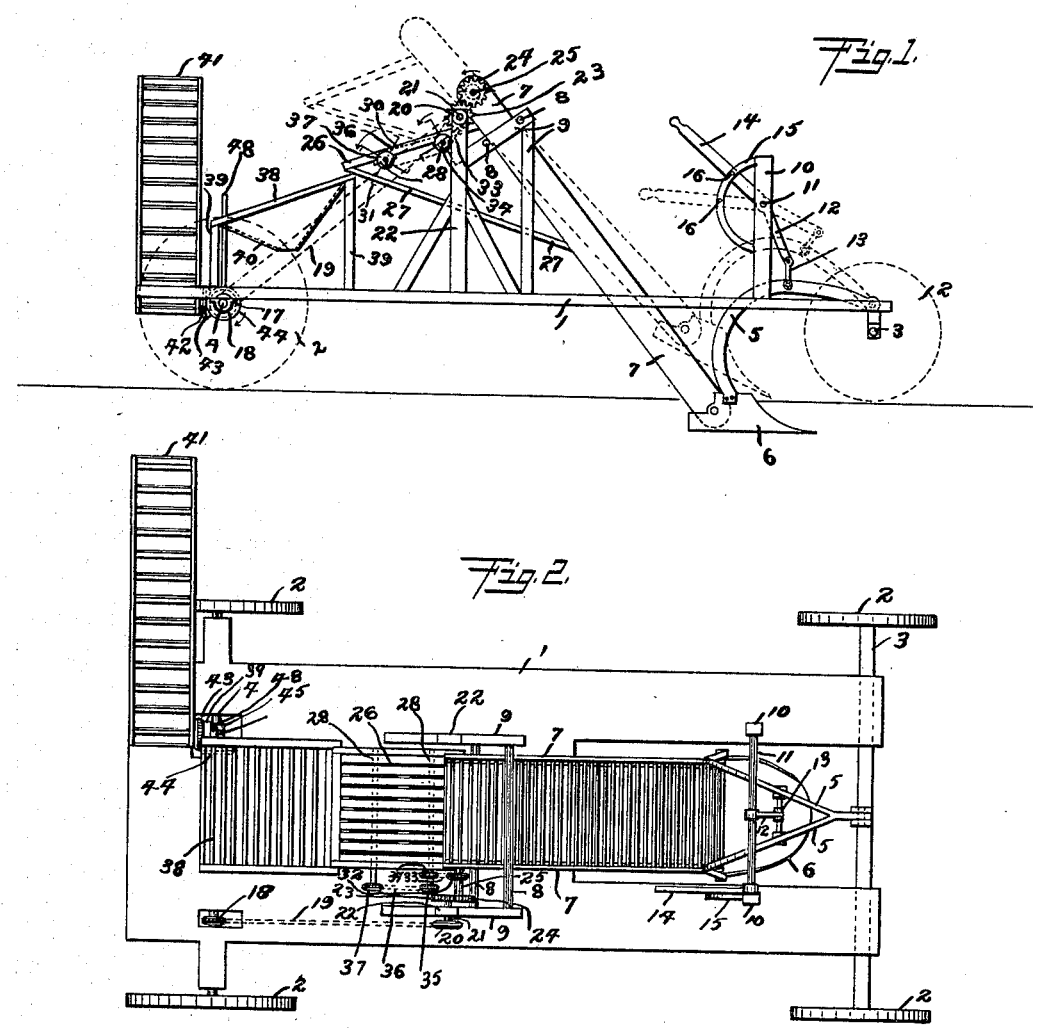

No. 735,283.

Patented August 4, 1903.

UNITED STATES PATENT OFFICE.

HERMANN R. MUENSTER, OF OMAHA, NEBRASKA.

POTATO-DIGGER.

SPECIFICATION forming part of Letters Patent No. 735,283, dated August 4, 1903.

Application filed June 2, 1902. Serial No. 109,983. (No model.)

*To all whom it may concern:*

Be it known that I, HERMANN R. MUENSTER, a citizen of the United States, residing at Omaha, in the county of Douglas and State of Nebraska, have invented certain new and useful Improvements in Potato-Diggers; and I do hereby declare the following to be a full, clear, and exact description of the invention, such as will enable others skilled in the art to which it appertains to make and use the same.

My invention relates to machines for digging potatoes; and it is the object thereof to provide a simple, convenient, and economical device for the above purpose which shall also automatically clean, sort, and load the potatoes into bags or wagons.

The above objects are attained by the mechanism shown in the accompanying drawings, in which—

Figure 1 is a side elevation of a machine embodying my invention. Fig. 2 is a plan view of the same. Fig. 3 is a detail front elevation of the driving-gear of the loading-conveyer. Fig. 4 is a detail longitudinal section through the elevating-conveyer and the cleaning-table. Fig. 5 is a detail longitudinal section through the sorting-table and filling-hopper thereunder, and Fig. 6 is a detail front elevation of the plow.

In the construction shown a platform 1 is supported on a suitable running-gear comprising the wheels 2 2 2 2, the axle 3, and the shaft 4.

Pivoted at the front end of the platform 1 and centrally thereto is the plow-beam 5, which extends rearwardly, and divides into two parts, which curve downwardly and are secured to the upper edges of the U-shaped round-nosed plow 6. At the rear end of and between the vertical sides of the plow is pivoted the lower end of the elevating-conveyer 7, which extends upwardly and rearwardly and is supported at its upper or rear end by the shafts 8 8, secured in the standards 9 9, extending up from the platform 1. An opening is made in the platform above the plow and where the conveyer extends up through the same. On each side of the said opening are standards 10 10, between which passes a shaft 11. On the said shaft is a crank 12, which extends downwardly and has on its lower end a short connecting-rod 13, joining it to the plow-beam 5. Adjacent to one of the standards 10 on the shaft 11 is a lever 14, secured to said shaft and lying close to the segment 15 on the said standard. Holes 16 through the lever and segment permit the same to be pinned together and held in a fixed relative position. When the lever 14 is pressed downward, the crank 12, plow-beam, plow, and elevating-conveyer are raised to the position indicated in dotted lines in Fig. 1.

The rear wheels 2 2 are rigidly secured to the shaft 4, which is journaled in suitable bearings 17 17 on the under side of the platform. On the said shaft 4 is secured the sprocket-wheel 18, from which a chain 19 extends to a second sprocket 20 on shaft 21, journaled in the standard 22, extending up from the platform. On the inner end of the shaft 21 is a gear 23, which when the conveyer and plow are in the lowered position (shown in Fig. 1) meshes with a gear 24 on shaft 25, passing through the upper end of the elevating-conveyer 7. When the machine is moved forward, the shaft 4 is revolved and the elevating-conveyer driven in the direction indicated in the drawings.

Slightly below the upper end of the elevating-conveyer and extending rearwardly and downwardly therefrom is the cleaning-table 26, which is braced by the bars 27, extending to the sides of the conveyer. The said cleaning-table is formed of longitudinally-extending strips placed close together, so as to leave only a narrow slot between them. Below the table and journaled in suitable bearings at the side thereof are the shafts 28, which carry a number of small hubs 29, from which extend the radial arms 30, having the hooked ends 31 thereon. The said radial arms 30 pass through the slots formed in the table 26 and somewhat above the same. On the shaft 25 is a small sprocket 32, from which a chain 33 extends to a sprocket 34 on the front shaft 28. On the latter shaft is another sprocket 35, from which a chain 36 extends to a sprocket 37 on the rear shaft 28. When the shaft 25 and the conveyer 7 are driven, as before described, the shafts 28 are also driven by means of the said sprockets and chains.

Below the end of the cleaning-table 26 and extending rearwardly and downwardly therefrom is the separating or sorting table 38, which consists of transverse slats, as shown in Figs. 2 and 5. The said table is supported by uprights 39 39 on the platform 1, and below the same is a hopper 40, as shown in Figs. 1 and 5.

At the rear end of the platform and extending upwardly and outwardly from one side thereof is the loading-conveyer 41. On the shaft 42 at the lower end of the said conveyer is a miter-gear 43, which meshes with a second miter-gear 44 on the shaft 4. The said gear is fitted loosely on the shaft and at one side is provided with a clutch 45, adapted to engage with the clutch 46, slidably secured to the shaft 4 by a feather 47. A forked lever 48, pivoted on one of the standards 39, engages with the clutch 46, so as to move the same into or out of engagement with the clutch 45 on the gear 44. This arrangement is clearly shown in Fig. 3.

The operation of the device is as follows: The machine is pulled along a row of the potatoes to be dug, so that the plow 6 catches the earth containing the potatoes and directs the same onto the elevating-conveyer 7, which is driven by the means hereinbefore described. The said conveyer being formed of slats, with openings between the same, as indicated in Fig. 4, the greater part of the earth falls through the same and is not carried all the way up the said conveyer. On reaching the top of the said conveyer the potatoes are dumped onto the cleaning-table 26 and the remaining earth falls through the slots in the same. At the same time the vines, &c., which have been carried up by the conveyer are pulled through the slots by the rotating hooked radial arms 30. The potatoes roll down the cleaning-table and onto the sorting-table 38, where the smaller sizes of the potatoes fall through the openings in the said table, are caught by the hopper 40 under the same, and directed into a bag placed under the opening of said hopper. The larger sizes of potatoes roll off the end of the table, where they may be caught in bags or directed onto the loading-conveyer 41 and carried into a wagon, which may be driven alongside the digging-machine. When it is not desired to use the loading-conveyer, the lever 48 is thrown so as to bring the clutches 45 and 46 out of engagement, thus allowing the shaft 4 to turn freely without moving the miter-gear 44. When turning at the ends of rows or otherwise moving the machine when not digging, the lever 14 is pushed down, thus raising the plow clear of the ground, raising the elevating-conveyer, throwing the gears 23 and 24 out of engagement, and stopping the running of this part of the machine, as hereinbefore described.

Now, having described my invention, what I claim, and desire to secure by Letters Patent of the United States, is—

1. A potato-digger comprising a platform, a running-gear, a plow-beam pivoted on said gear, a plow carried thereby, an elevating-conveyer, a cleaning-table, a sorting-table, means for raising said plow and elevating-conveyer simultaneously, and means for driving the elevator, said latter means being thrown into and out of operative action by movement of the plow and elevating-conveyer.

2. A potato-digger, comprising a platform, a running-gear, a plow carried thereby, an elevating-conveyer connected to the plow, a cleaning-table connected to the said conveyer, a loading-conveyer in communication with the cleaning-table, and means for raising the plow and the first-mentioned conveyer and the cleaning-table simultaneously.

3. A potato-digger, comprising a platform, a running-gear, sets of standards mounted upon the platform, a plow-beam connected to the running-gear, and extending inwardly between one set of standards, a plow-point connected to the plow-beam, an elevating-conveyer connected to the plow-point and extending rearwardly between another set of standards, a cleaning-table connected to the conveying-elevator, and means mounted between the first-mentioned standards for raising the plow, the conveyer and the cleaning-table simultaneously.

4. A potato-digger, comprising a platform, a running-gear, sets of standards mounted upon the platform, a plow-beam connected to the running-gear and extending inwardly between one set of standards, a plow-point connected to the plow-beam, an elevating-conveyer connected to the plow-point and extending rearwardly between another set of standards, a cleaning-table connected to the conveying-elevator, a loading-elevator in communication with the cleaning-table, and a lever pivoted between the first-mentioned standards for raising and lowering the plow, the first-mentioned conveyer and the cleaning-table simultaneously.

5. A potato-digger comprising a platform, a running-gear, sets of standards mounted upon the platform, a plow-beam connected to the running-gear and extending inwardly between one set of standards, a plow-point connected to the plow-beam, an elevating-conveyer pivoted to the plow-point and extending rearwardly between another set of standards, a cleaning-table connected to the conveying-elevator, a loading-elevator in communication with the cleaning-table, means for driving the conveyer-elevator, and a lever pivoted between the first-mentioned standards for raising and lowering the plow, the first-mentioned conveyer and the cleaning-table simultaneously, and at the same time throwing the conveying-elevator out of driving position.

In testimony whereof I hereunto affix my signature in presence of two witnesses.

HERMANN R. MUENSTER.

Witnesses:
D. O. BARNELL,
HARRY S. SMITH.